(12) United States Patent
Gunnalan et al.

(10) Patent No.: US 11,418,568 B2
(45) Date of Patent: Aug. 16, 2022

(54) MODEL-BASED PARAMETER SELECTION FOR MEDIA SESSIONS

(71) Applicant: Microsoft Technology Licensing, LLC, Redmond, WA (US)

(72) Inventors: Rajesh Gunnalan, Sammamish, WA (US); Huazhou Liu, Redmond, WA (US); Jiannan Zheng, Redmond, WA (US); Tin Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/379,296

(22) Filed: Jul. 19, 2021

(65) Prior Publication Data

US 2021/0344737 A1 Nov. 4, 2021

Related U.S. Application Data

(63) Continuation of application No. 16/570,609, filed on Sep. 13, 2019, now Pat. No. 11,089,078.

(51) Int. Cl.
| | | |
|---|---|---|
| *G06F 15/16* | (2006.01) | |
| *H04L 65/80* | (2022.01) | |
| *G06N 20/00* | (2019.01) | |
| *H04L 43/0864* | (2022.01) | |
| *H04L 43/087* | (2022.01) | |
| *H04L 65/1069* | (2022.01) | |
| *H04L 65/403* | (2022.01) | |

(52) U.S. Cl.
CPC ............. *H04L 65/80* (2013.01); *G06N 20/00* (2019.01); *H04L 43/087* (2013.01); *H04L 43/0864* (2013.01); *H04L 65/1069* (2013.01); *H04L 65/403* (2013.01)

(58) Field of Classification Search
CPC ... H04L 65/80; H04L 43/0864; H04L 43/087; H04L 65/1069; H04L 65/403; G06N 20/00
USPC .......................................................... 709/231
See application file for complete search history.

(56) References Cited

U.S. PATENT DOCUMENTS

| | | | | |
|---|---|---|---|---|
| 7,546,376 B2* | 6/2009 | Widegren | ............. | H04M 15/56 709/231 |
| 7,958,242 B2* | 6/2011 | Rey | ................... | H04L 29/06027 709/227 |
| 8,806,012 B2* | 8/2014 | Ramachandran | ....... | H04L 67/14 709/227 |
| 2002/0099842 A1* | 7/2002 | Jennings | ............... | H04L 47/826 709/231 |
| 2003/0115349 A1* | 6/2003 | Brinkman | .......... | G06Q 20/4014 709/231 |
| 2005/0091380 A1* | 4/2005 | Gonen | .................. | H04L 65/403 709/227 |

(Continued)

*Primary Examiner* — Anthony Mejia
(74) *Attorney, Agent, or Firm* — Schwegman Lundberg & Woessner, P.A.

(57) ABSTRACT

Techniques for providing improved online communication are provided herein. In one example, a model may be used to predict network parameters of a network connection of a computing device. One or more attributes specifying characteristics of the network connection for the computing device may be received and used by the model to predict the network parameters. The predicted network parameters may be provided to a computing device for initiation of a media session.

20 Claims, 7 Drawing Sheets

(56) References Cited

U.S. PATENT DOCUMENTS

| | | | |
|---|---|---|---|
| 2007/0025301 A1* | 2/2007 | Petersson | H04L 47/263 370/338 |
| 2007/0160072 A1* | 7/2007 | Thalanany | H04W 36/30 370/352 |
| 2007/0198739 A1* | 8/2007 | Jennings | H04L 67/2838 348/E7.071 |
| 2010/0211689 A1* | 8/2010 | Bijwaard | H04N 21/64322 709/228 |
| 2010/0262710 A1* | 10/2010 | Khatib | G11B 27/034 715/723 |
| 2010/0299433 A1* | 11/2010 | De Boer | H04L 47/14 709/224 |
| 2013/0275615 A1* | 10/2013 | Oyman | H04L 67/303 709/231 |
| 2013/0304934 A1* | 11/2013 | Joch | H04L 47/125 709/231 |
| 2013/0339464 A1* | 12/2013 | Goudarzi | H04L 51/36 709/227 |
| 2014/0019635 A1* | 1/2014 | Reznik | H04L 67/02 709/231 |
| 2014/0181266 A1* | 6/2014 | Joch | H04L 69/14 709/219 |
| 2014/0359156 A1* | 12/2014 | Manber | H04N 21/2343 709/231 |
| 2015/0039680 A1* | 2/2015 | Gallant | H04L 12/1457 709/231 |
| 2015/0113156 A1* | 4/2015 | Smith | H04L 65/60 709/231 |
| 2015/0149591 A1* | 5/2015 | Gibbon | H04L 65/80 709/219 |
| 2015/0163273 A1* | 6/2015 | Radcliffe | H04L 65/605 709/231 |
| 2016/0127260 A1* | 5/2016 | Gordon | H04N 21/234 709/231 |
| 2016/0156691 A1* | 6/2016 | Leeb | H04L 65/1069 709/225 |
| 2019/0124408 A1* | 4/2019 | Xiong | H04N 17/00 |
| 2020/0084232 A1* | 3/2020 | Lebling | H04L 63/1441 |

* cited by examiner

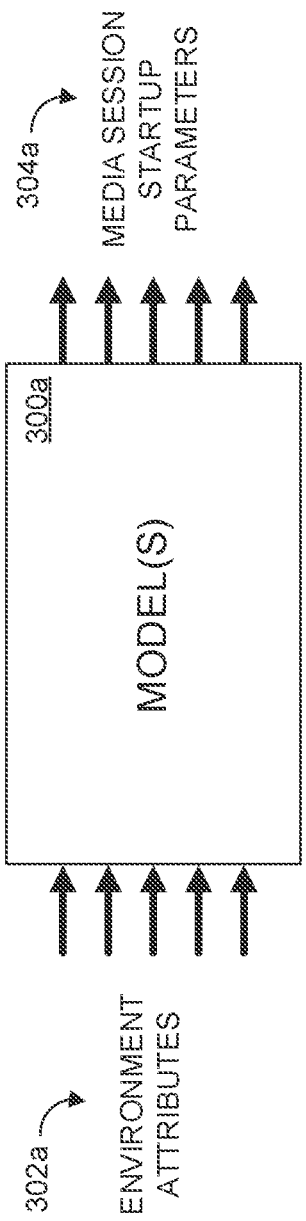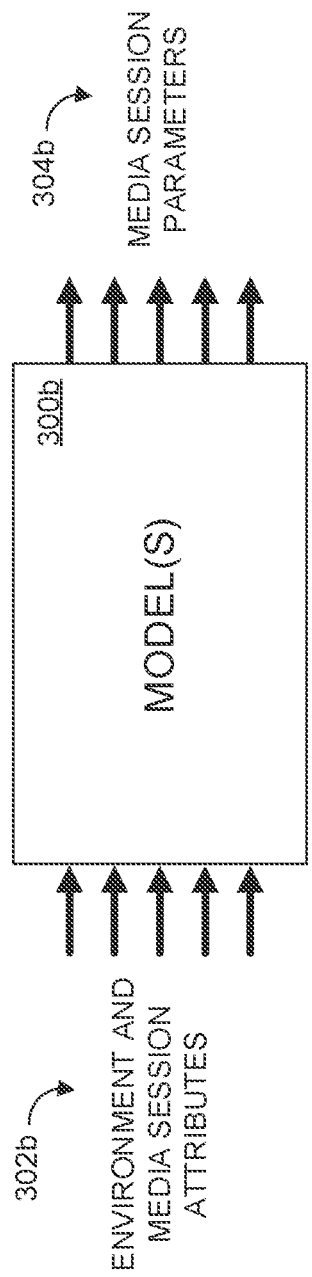

MODEL-BASED PARAMETER SELECTION FOR MEDIA SESSIONS

CROSS-REFERENCE TO RELATED APPLICATIONS

This application is a continuation of prior application Ser. No. 16/570,609, filed on Sep. 13, 2019, which is incorporated by reference herein in its entirety.

TECHNICAL FIELD

This document pertains generally, but not by way of limitation, to media sessions, and particularly but not by way of limitation to model-based selection of parameters for media sessions.

BACKGROUND

Media sessions, such as peer-to-peer communications, web conferences, and the like, are established and participated in by users using a wide range of devices connecting through a wide range of network connections. Applications used to perform online media sessions may include a media stack configured to control execution of the media session. When initializing a media session, the media stack parameters may be set using default parameters, which may be conservatively chosen to ensure connectability across all devices and network connections.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 3A and 3B are diagrams illustrating example media session models used to generate parameters for a media stack.

DETAILED DESCRIPTION

Systems and methods are disclosed herein that facilitate model-based selection of parameters for online media sessions. Media sessions, such as peer-to-peer communications, online conferences, and the like, may be executed using one or more protocol stacks that include one or more functions to execute the media session for particular computing devices connecting through particular network connections. The functions of the protocol stack may be controlled/executed using one or more parameters set for each media session. Conventionally, these parameters were set using default values, and updated based on feedback as the media session executed.

Attributes may be determined for a computing device executing one or more applications to initiate and participate in a media session. The attributes may be environmental attributes that include a tenant ID, geographic location, internet service provider (ISP), platform, network connection type, user identifier, time, date, and the like. These attributes may be used to define a context of the computing device and respective network connection, for example. The context may be used to reference one or more models configured to generate or otherwise select optimal session parameters based on the context. The session parameters may be used to control and/or execute one or more functions of the protocol stack to initialize and/or execute a media session. For example, these parameters may be selected and applied to initiate a media session before any dynamic quality feedback, such as one or more metrics for the respective network connection, is available for the media session.

Figure 1:
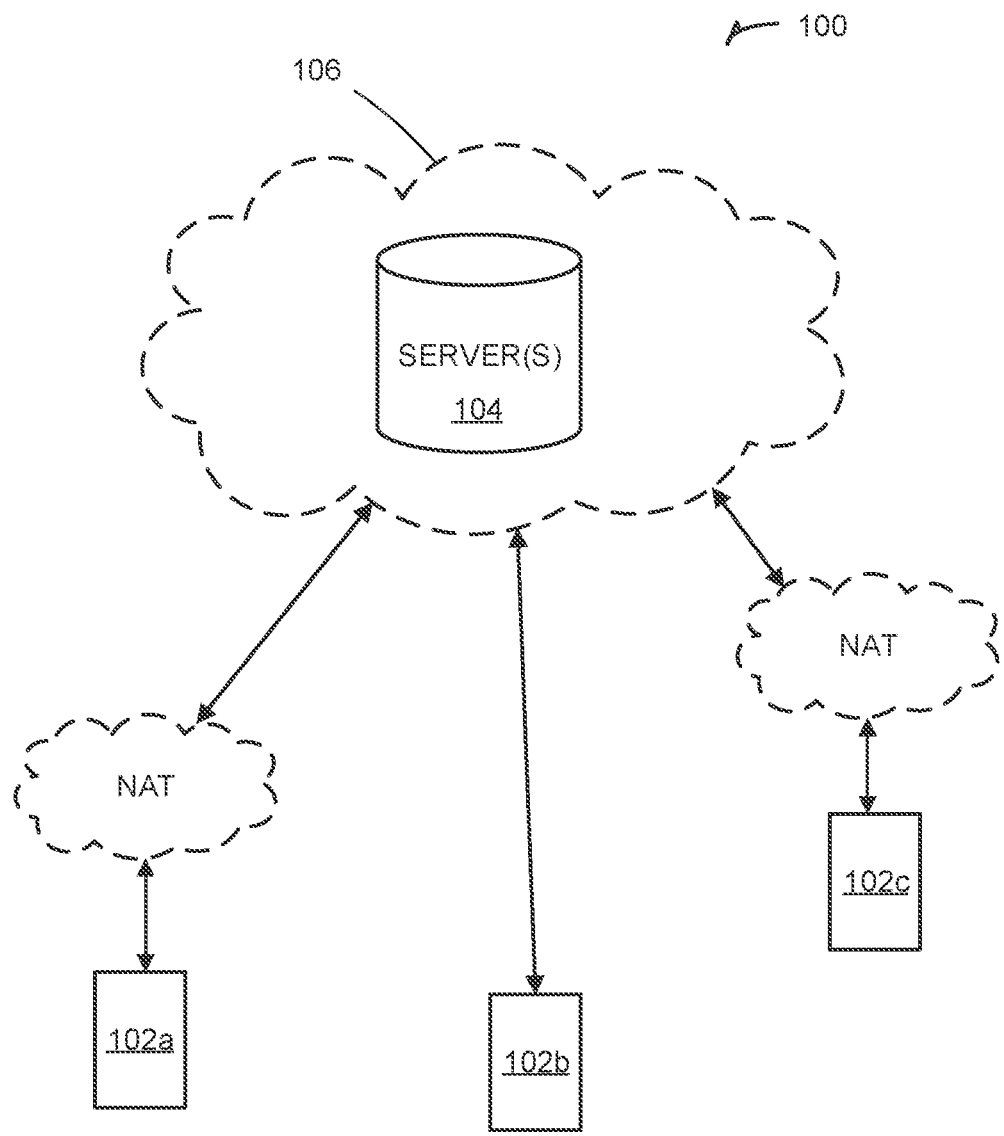
FIG. 1 is a network diagram illustrating several computing devices configured to initiate and conduct media sessions.

FIG. 1 is a network diagram illustrating a system 100 that includes several computing devices 102a-102c configured to initiate and conduct media sessions through one or more servers 104. The servers 104 may be located in a single geographic location, or may be distributed across several remote locations. The computing devices 102a-102c may be configured to access the servers 104 through one or more networks 106, which may be one or more wired and/or wireless networks. The computing devices 102a-102c may be any computing devices including mobile phones, tablets, laptop computers, desktop computers, wearable devices, and the like.

Each computing device 102a-102c may be configured to execute one or more applications to initiate and conduct media sessions with other respective computing devices 102a-102c or with any other computing devices located in any geographic locations. Some computing devices, such as is illustrated by computing devices 102a and 102c, may be on private networks behind firewalls and/or routers that use network address translation (NAT). The computing devices 102a-102c may be in different geographic locations including in different countries and may be connected to the networks 106 through vastly different network connections. In some examples, a computing device may be a desktop computer connected in a corporate setting, a mobile device accessing the networks 106 in an airport, a low power device on a low bandwidth cellular network, or any other computing system having any other network connection.

The computing devices 102a-102c may be configured to initiate media sessions, including peer-to-peer communications, audio and/or video web conferences, and the like with one or more other computing devices 102a-102c. For example, the peer-to-peer communication may be an audio-only communication such as through the public switched telephone network (PSTN), or may be a multi-user web conference that includes audio and video. Each computing device 102a-102c may have a different set of specifications including central processing unit (CPU) speed, memory and hard disk capacity, and the like resulting in each computing device 102a-102c having a different optimal configuration for executing media sessions.

Each computing device 102a-102c may also be connected to the networks 106 through different network configurations and conditions including combinations of user datagram protocol (UDP), transmission control protocol (TCP), hypertext transfer protocol secure (HTTPS) connections, wired connections, Wi-Fi®, $2^{nd}$ Generation (2G), $3^{rd}$ Generation (3G), $4^{th}$ Generation (4G), or $5^{th}$ Generation (5G) cellular networks, consumer home networks, business networks, and the like. This wide variation in conditions for each computing device 102a-102c requires the protocol/media stack used to execute media sessions to handle varying network characteristics including bandwidth, loss, jitter, delay, reliability, and the like.

Figure 2:
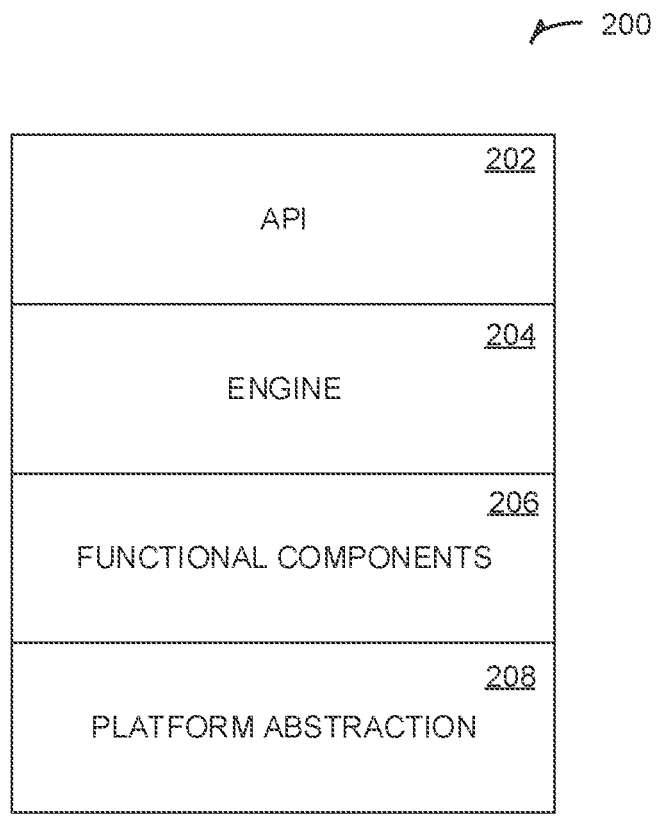
FIG. 2 is a diagram illustrating an example media stack used to execute online media sessions.

FIG. 2 is a diagram illustrating an example media stack 200 used to execute online media sessions for a respective computing device, such as the computing devices 102a-102c. The media stack 200 may be implemented by one or more applications executing on the computing devices 102a-102c and may include application programming interface (API) layer 202, engine layer 204, functional components layers 206, and platform abstraction layer 208. While illustrated with 4 layers, other media/protocol stacks may include more, fewer, or alternative layers. Each of the API layer, 202, engine layer 204, functional components layer 206, and platform abstraction layer 208 may include one or more operational components. Each of these operational components may receive one or more parameters for execution. The media stack 200 may be implemented in any combination of hardware and software and the software components may be implemented using any desirable programming language, for example.

The API layer 202 may provide media stack interfaces that implement an offer/answer protocol, for example. In an example, the API layer 202 implements Session Description Protocol (SDP) using offer/answer transaction semantics. The API layer 202 may also include an interface for media servers. The engine layer 204 may be implemented to handle running environment differences between respective computing devices and servers. The engine layer 204 may also establish the platform and facilitate threading and interaction of components of the functional components layer 206. The platform abstraction layer 208 may be configured to provide the upper layers (202, 204, and 206) a common set of primitives independent of a platform of a respective computing device and provide abstraction for networking, cryptography, physical audio/video device access, logging, synchronization primitives, persistent storage primitives, experiment and configuration services (ECS), and the like.

The functional components layer 206 may include a collection of reusable components which can each implement various functionalities. These functionalities may be self-contained, for example, and may include physical and virtual audio/video/data device logic and management, network connectivity logic, network address translation (NAT) traversal and wire protocols, client and server audio pipeline and audio digital signal processing (DSP) algorithms, client and server video pipeline and video DSP algorithms; bandwidth estimation/distribution and codec selection; telemetry framework, real-time transport protocol (RTP)/RTP control protocol (RTCP) and respective extensions, encryption, payload specific packetizations, audio/video codec implementations, server audio/video mixing/subscription, dominant speaker logic, audio/video/data routing, container classes, buffer management, and the like.

The components of the functional components layer 206 may include one or more configurable parameters that control how the component executes during initiation, execution, and recovery of a media session. For example, a codec selection component may have a parameter that specifies a codec for use during a respective media session.

In conventional systems, many of these configurable parameters have been set to default values for initialization of a media session. These default parameters have often been conservative to ensure that users with poor network connections are still able to successfully initiate and participate in online communications. This may be to the detriment of users with good network connections, as it can take time for the parameters to be dynamically updated to more closely reflect the capabilities of a respective network connection.

FIGS. 3A and 3B are diagrams illustrating example media session models 300a and 300b used to generate parameters for startup and execution of media sessions. While illustrated as two models 300a and 300b, models 300a and 300b may be part of the same model, or may each be implemented as several individual models. Model 300a may be configured to receive attributes and generate or otherwise select predicted optimal media session startup parameters, and model 300b may be configured to receive attributes and/or data gathered during execution of a media session and generate or otherwise select updated media session parameters to update parameters for a media session already in progress.

The attributes may be used to define a user context that can be used as input to the models 300a and 300b, or to select an individual model. The attributes may be environmental attributes that include one or more of a tenant ID, geographic location (such as country, state, city, geographic coordinates, and the like), internet service provider (ISP), platform, network connection type, user identifier, time, or the like. These attributes may be gathered by the computing device to form a user context for a respective computing device and network connection. The user context may represent user scenarios of varying levels of specificity. In one example, the model 300a may include customized models for many granular user contexts. In other examples, the model 300a may include one or a few models that may be used for each of a few most common user contexts, or anywhere between. Some example user contexts include, but are not limited to, a user in a corporate environment, a user in an airport on a mobile phone, a user on a low power tablet connected through a $3^{rd}$ Generation (3G) cellular network, and the like.

The output of the models 300a and 300b may be one or more predicted optimal media session parameters, such as may be used by one or more applications that include the media stack illustrated in FIG. 2. These parameters may include startup parameters used during a media session establishment phase, parameters used during execution of the media session, and/or parameters used during a recovery phase. The parameters may include, but are not limited to, RTCP probe packet cadence and size, time-to-wait before retransmission of a request following packet loss, media timeout, consent packet cadence and trigger for reconnect, retransmit probe cadence and size to improve receiver estimated maximum bitrate (REMB) performance, minimum video bitrate, number of participants to trigger conference modes, initial bandwidth, various bandwidth limits, audio codec, video codec, jitter buffer size, and the like. The outputs from the models 300a and 300b may be directly applied to the media stack 200, for example, during initiation and/or execution of a media session.

In an example, in conventional systems, an initial bandwidth is unknown, and therefore the initial bandwidth chosen for a media session may be chosen conservatively to have a low throughput in order to avoid causing network congestion. In these conventional systems, it may take up to 20 to 30 seconds to ramp up the bandwidth estimation to an accurate value. During this time, a sender is not fully utilizing a network capacity, which can be detrimental for high resolution video/appsharing which may require delivery of large frames of data quickly at the beginning of a communication. By predicting the optimal startup parameters for the media session based on the media context, the initial bandwidth may be chosen to more accurately reflect a computing device's network connection, removing the initial 20 to 30 second ramp up in bandwidth estimation, improving a media session experience for the user.

To generate predicted optimal parameters, the models 300a and 300b may be initially trained using historical data, for example, using one or more machine-learning techniques, such as is described in more detail below with respect to FIG. 4. Example machine-learning techniques/algorithms may include logistic regression, neural networks, decision forests, decision jungles, boosted decision trees, support vector machines, and the like. The historical data may include media stack data, for example, regarding past audio and/or video communications. For example, training data may be generated using historical data and may include past attributes or user contexts labeled with respective optimal media session startup and/or execution parameters. The historical data may also include network data not directly related to online communications, for example. This historical data can be used to train the models 300a and 300b using supervised or unsupervised learning, for example.

The models may also be updated during and/or after execution of each media session. For example, data may be gathered during media sessions regarding bandwidth, loss, jitter, delay, reliability, and the like. Knowing the media context, the gathered data can be used to further train/update the model using one or more machine-learning techniques/algorithms. This may occur in real-time, such that the models are updated during execution of a media session, or may occur at a later time, such as after a media session has completed. By updating the model using the actual data, the system may more accurately set the initial media session startup parameters for future media sessions.

The one or more models 300b may be used during execution of a media session and take data gathered during the media session as additional input. This data may include, but is not limited to, a connectivity protocol, network round-trip time (RTT), loss characteristics, jitter characteristics, bandwidth characteristics, device rating, connectivity path type, and the like. The model 300b may also take the device context as input and generate updated session parameters for the respective media session. These updated session parameters may be provided to the media stack 200, for example, during execution of the media session to provide one or more users with a better experience during the media session.

The models 300a and 300b allow more optimal parameters to be established for a media stack during initiation and/or execution of media sessions to improve the user experience. In an example, the models 300a and/or 300b may be able to capture underlying networking characteristics in corporate networks. The input to the model 300a or 300b may indicate a location at which an employee is located. Through machine learning and training, the model 300a or 300b may be able to detect and provide optimal parameters for scenarios that include, but are not limited to, a private network allowing UDP connectivity and having high bandwidth to provide a high quality experience, optimal codec choices for a given user, HTTP Proxy being the only available connectivity for a private network, use of alternate protocols works temporarily but will result in delayed whitelisting failures of a communication, all real time media traffic for a given user must be forced through a relay server, and the like. The models 300a and 300b may also allow the media stack to learn and adapt to congested remote site locations, provide jitter buffer and healer adaptation for proxy only environments, and the like.

In addition to capturing underlying networking characteristics for corporate networks, the models 300a and 300b may be able to capture underlying network characteristics for home networks and public networks. For example, as seen in FIG. 1, computing devices 102a and 102c include network address translation (NAT). Specific NAT behavior can affect connectivity for media sessions. This behavior can be anticipated and accommodated using the models 300a and 300b. Some scenarios that may be detected and accommodated for using the models 300a and 300b may include switching to relay-relay paths if a home NAT is known to be problematic from prior connectivity attempts, identifying and adapting to virtual private network (VPN) usage, adapting to ISP specific traffic shaping and load characteristics, and the like. The models 300a and 300b may also be able to provide optimal parameters for usage from popular public locations including coffee shops, hotspots, airports, in-flight Wi-Fi® networks, and the like.

Figure 4:
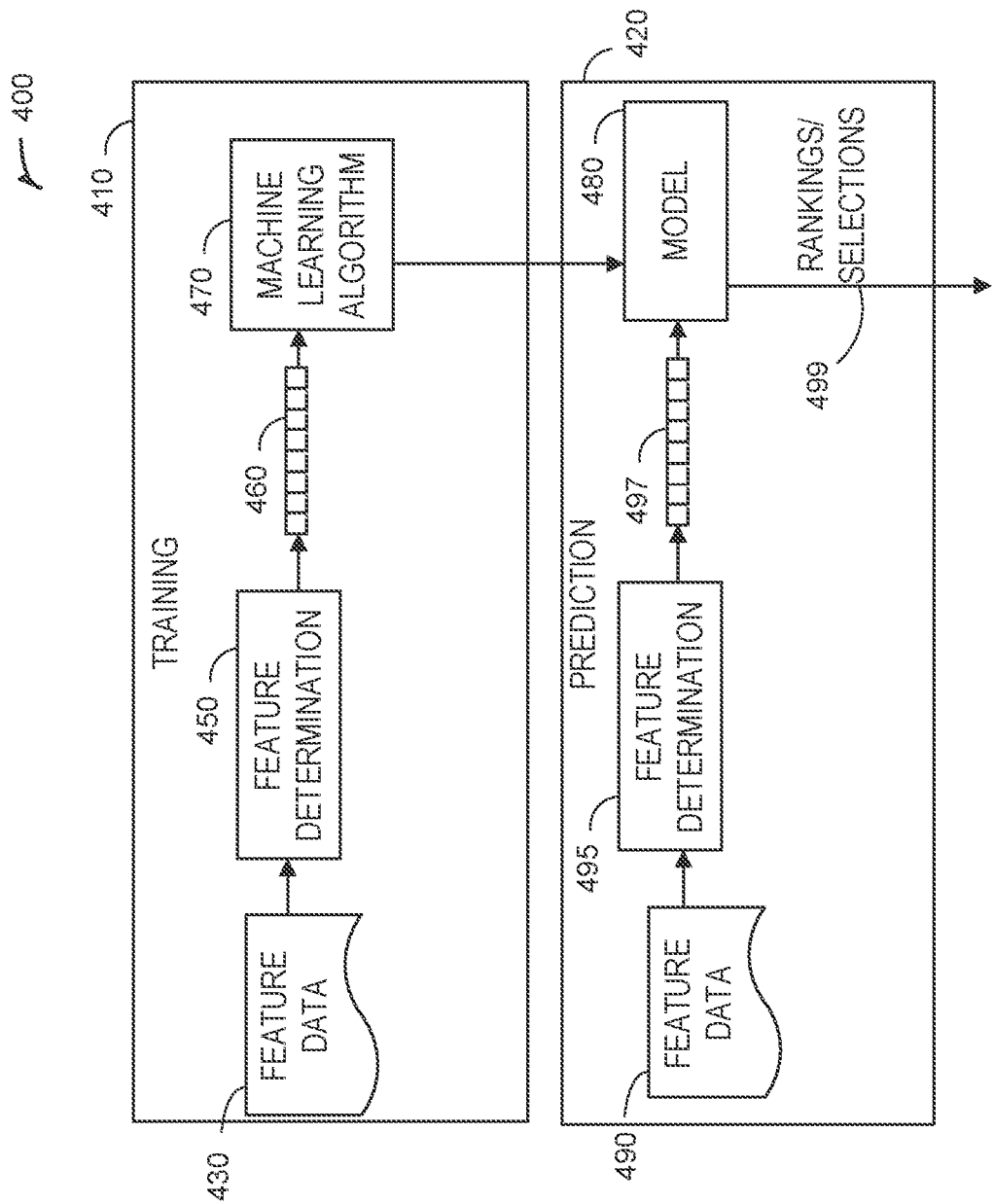
FIG. 4 is a diagram illustrating an example machine learning module.

FIG. 4 is a diagram illustrating an example machine learning module 400 for training and/or using a model, such as the models 300a and 300b. The machine learning module 400 may be implemented in whole or in part by any servers 104 and/or any of the computing devices 102a-102c. In some examples, the training module 410 may be implemented by a different device than the prediction module 420. In these examples, the model 480, which may be either of the models 300a and/or 300b, may be created on a first machine and then sent to a second machine (for example, created by servers 104 and send to one of the computing devices 102a-102c).

Machine learning module 400 utilizes a training module 410 and a prediction module 420. Training module 410 inputs feature data 430 into feature determination module 450. The feature data 430 may include attributes such as environmental attributes indicating a country or other geographic location, tenant ID, user ID, endpoint ID, platform type, ISP, available network interfaces on the computing device, available audio and video devices and drivers on the computing device, a time and day, and the like.

Feature determination module 450 determines one or more features for feature vector 460 from the feature data 430. Features of the feature vector 460 may be one or more user contexts is information determined to be predictive of relevant media stack parameter selections, for example. Features chosen for inclusion in the feature vector 460 may be all the feature data 430 or in some examples, may be a subset of all the feature data 430. In examples in which the features chosen for the feature vector 460 are a subset of the feature data 430, a predetermined list of which feature data 430 is included in the feature vector may be utilized. The feature vector 460 may be utilized (along with any applicable labels) by the machine learning algorithm 470 to produce a model 480.

In the prediction module 420, the current feature data 490 may be input to the feature determination module 495. Feature determination module 495 may determine the same set of features or a different set of features as feature determination module 450. In some examples, feature determination module 450 and 495 are the same modules or different instances of the same module. Feature determination module 495 produces feature vector 497, which are input into the model 480 to rankings or selections of media stack parameters 499.

The training module 410 may operate in an offline manner to train the model 480. The prediction module 420, however, may be designed to operate in an online manner. It should be noted that the model 480 may be periodically updated via additional training and/or user feedback. For example, additional feature data 430 may be collected as users initiate and participate in various online media sessions. The attributes may then be fed back through the training module 410 labelled with optimal parameters in order to refine the model 480.

The machine learning algorithm 470 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 410.

Figure 5:
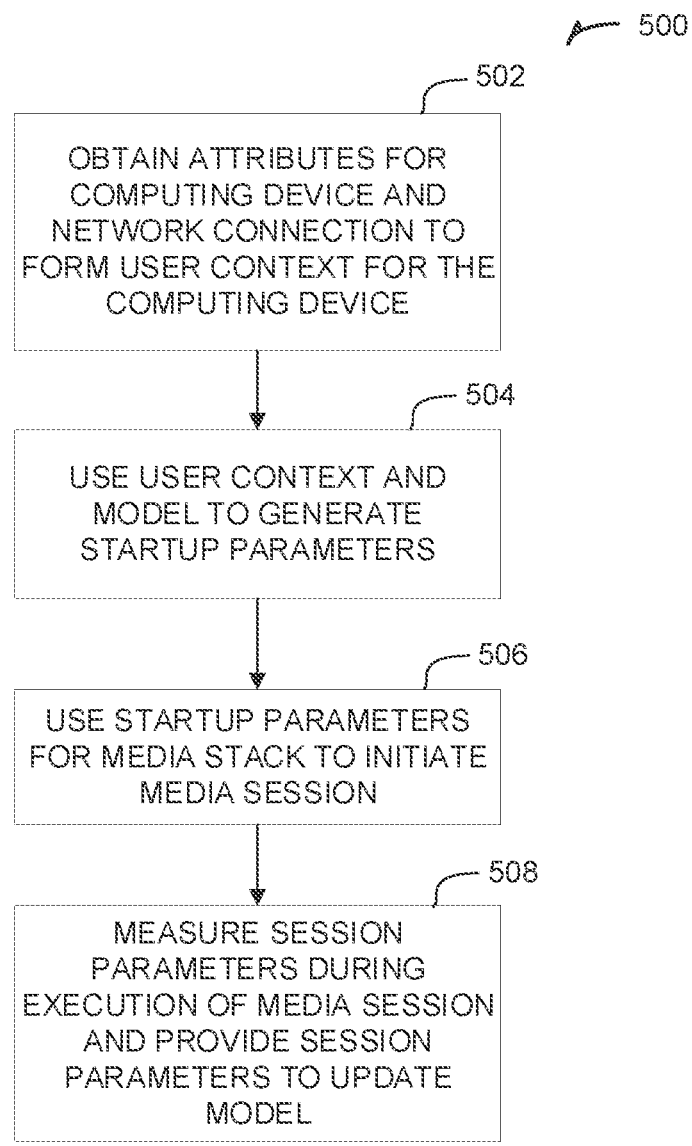
FIG. 5 is a flowchart illustrating a method of initializing a media session using a media session model.

FIG. 5 is a flowchart illustrating a method 400 of initializing a media session using a media session model such as any of the models discussed herein. At step 502, attributes are gathered for a computing device. This step may occur prior to initiation of the media session and thus, prior to availability of any feedback data for the media session, such as network metrics for one or more computing devices and/or one or more network connections for the media session. In some examples these attributes may be transmitted to the servers 104. For example, prior to initiating a media session, a respective computing device may gather network attributes, such as a country or other geographic location, tenant ID, user ID, endpoint ID, platform type, ISP, available network interfaces on the computing device, available audio and video devices and drivers on the computing device, a time and day, and the like. Obtainment of the attributes may be automatic by the computing device in response to a communication client application being opened on the computing device, for example. The application running on the computing device may gather the attributes immediately upon startup, or upon a user commanding the application to perform one or more functions, such as initiating an online communication event. In another example, one or more servers may instruct the computing device to gather the attributes.

In an example, the server or the computing device may compile the attributes to determine a context indicative of one or more user contexts. The user contexts may be as granular as desired. For example, a general user context may exist for mobile devices on second generation (2G) cellular networks in a specified country. The user context and/or the individual attributes may be input or otherwise used to reference the one or more models to generate predicted startup parameters for an upcoming media session. At step 504, media session startup parameters selections are output from the model. This step may be accomplished locally by a respective computing device, or by one or more servers. For example, the model may be stored by the computing device or transmitted to the computing device from the server upon request. The computing device may then provide the attributes and/or a user context to the model to generate the startup parameters. In another example, the computing device may transmit the attributes and/or the user context to the servers and the servers may provide the attributes and/or user context to the model to generate the startup parameters. If the servers generate the startup parameters, the servers may transmit the startup parameters to the computing device to initiate the media session.

At step 506, the media session is initiated by one or more applications executing on the computing device using the startup parameters generated at step 404. The startup parameters may include transport protocol stack parameters, a startup bandwidth seed, codec choices and parameters of an audio stack (such as jitter buffer) computing device specific optimizations, and the like. At step 508, data is gathered regarding the media session. This may include data regarding bandwidth, loss, jitter, delay, reliability, and the like. The model may be updated using the attributes and/or the data gathered such as is described above with reference to FIG. 4. This update may occur during and/or following execution of the media session. For example, the models may be trained each time data is gathered for a media session, or data may be gathered for many media sessions, and the model may be trained with the data regarding the many media sessions all at once.

Figure 6:
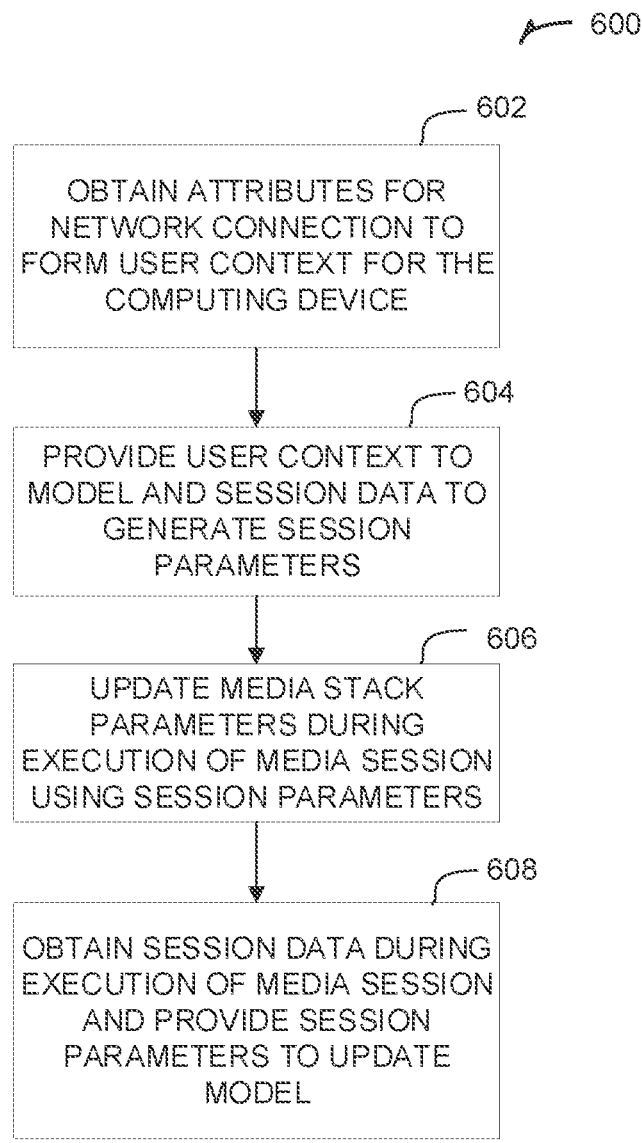
FIG. 6 is a flowchart illustrating a method of controlling parameters of a media stack while a media session is in progress.

FIG. 6 is a flowchart illustrating a method 600 of controlling parameters of a media stack while a media session is executing. At step 602, attributes are gathered by a computing device. In some examples, the computing device may transmit the attributes to the servers 104. For example, prior to or during execution of a media session, a respective computing device may gather network attributes, such as a country or other geographic location, tenant ID, user ID, endpoint ID, platform type, ISP, available network interfaces on the computing device, available audio and video devices and drivers on the computing device, a time and day, and the like.

In an example, the server or the computing device may compile the attributes to determine one or more user contexts based on the attributes. The user contexts may be as granular as desired. For example, a general user context may exist for mobile devices on second generation (2G) cellular networks in a specified country. Data may also be obtained regarding the current execution of the media session, such as bandwidth, loss, jitter, delay, reliability, and the like. The user context and/or the individual attributes and/or the data gathered regarding the current execution of the media session may be input to one or more models to generate parameters for a currently executing media session, such as is described above with reference to FIGS. 3 and 4. At step 604, updated parameters are generated by the model. This step may be accomplished by the computing device, or by the server. For example, the model may be stored by the computing device or transmitted to the computing device from the server upon request. The computing device may then provide the attributes and/or a user context and/or the data gathered to the model to generate the parameters. In another example, the computing device may transmit the attributes and/or the gathered data to the servers and the servers may provide the attributes and/or the gathered data to the model to generate the parameters. If the servers generate the parameters, the servers may transmit the parameters to the computing device to update the media stack during execution of the media session.

At step 606, the media stack is updated using the parameters from the model during execution of the media session.

At step 608, further data is gathered regarding the media session. This may include data regarding bandwidth, loss, jitter, delay, reliability, and the like. The model may be updated using the attributes and/or the data gathered such as is described above with respect to FIG. 4. This update may occur during and/or following execution of the media session. For example, the models may be trained each time data is gathered for a media session, or data may be gathered for many media sessions, and the model may be trained with the data regarding the many media sessions all at once.

While illustrated in FIGS. 5 and 6 as using the models during startup of a media session and execution of a media session, for example, one or more models may also be used to generate parameters for media session recovery. For example, upon completion of a media session, the attributes and/or data collected during execution of the media session may be used to generate parameters for use by the media stack 200, for example, during a recovery phase of the respective media session.

Figure 7:
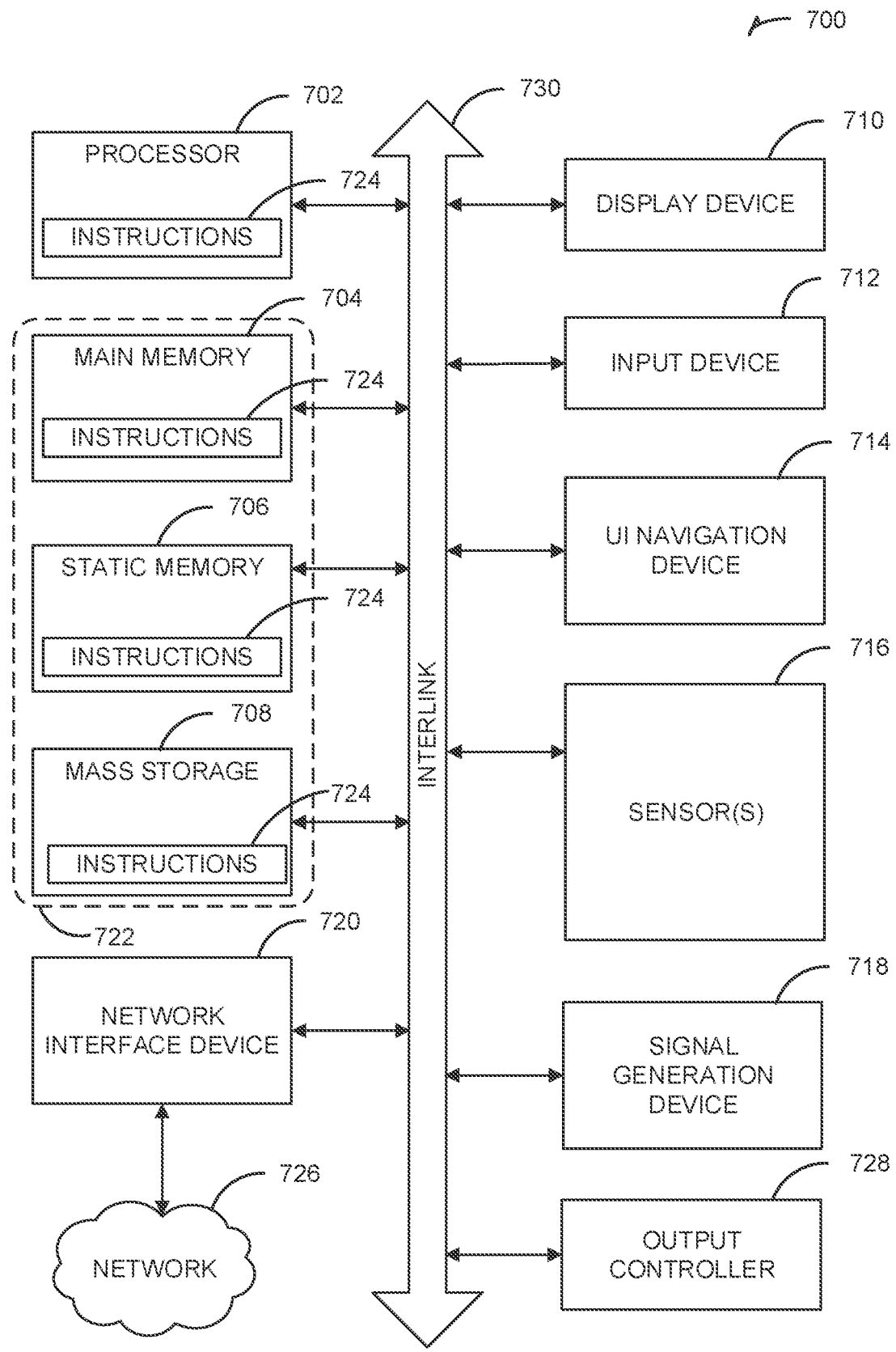
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. For example, the machine 700 can be any one or more of the servers 104, and/or computing devices 102a-102c. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of selecting network parameter values for online communication between computing devices using one or more hardware processors, the method comprising:
    prior to initiating a media session and prior to receiving feedback data indicative of one or more metrics of a network connection for a computing device for the media session:
        receiving one or more attribute values specifying characteristics of the network connection for the computing device for initiating the media session over one or more networks through the network connection;
        accessing a plurality of stored media session startup parameter values for initializing a media session, the plurality of stored media session startup parameter values associated with different attribute values;
        selecting one or more of the stored media session startup parameter values for the media session using the received one or more attribute values; and
        applying the selected one or more startup parameter values as initialization values for the media session; and
    initiating the media session on the computing device through the network connection using the initialization values.

2. The method of claim 1, wherein applying the selected one or more startup parameter values as the initialization values for the media session are configured to control one or more functions of a protocol stack to execute the media session.

3. The method of claim 1, wherein selecting one or more of the stored media session startup parameter values for the media session using the received one or more attribute values comprises:
    selecting one or more of the stored media session startup parameter values for the media session using a relationship between the stored media session startup parameter values for the media session and the received one or more attribute values,
wherein the one or more startup parameter values comprises one or more of a bandwidth, a network connection type, a timeout setting, or a codec, and
wherein the one or more attribute values comprise one or more of a geographic location, a network provider of the one or more networks, a type of the one or more networks, a type of the computing device, a platform of the computing device, a form factor, a time of day, a day of the week, or a workload of the computing device.

4. The method of claim 3, comprising:
subsequent to initiating the media session on the computing device through the network connection using the initialization values:
receiving feedback data indicative of one or more metrics of the network connection for the computing device for the media session; and
dynamically updating the relationship between the plurality of stored media session startup parameter values and the received one or more attribute values using the received feedback data.

5. The method of claim 1, wherein selecting one or more of the stored media session startup parameter values for the media session using the received one or more attribute values comprises: accessing a model using the received one or more attribute values; and generating, via the model, the one or more startup parameter values for the media session based on the received one or more attribute values, and wherein applying the selected one or more startup parameter values as initialization values for the media session comprises applying the generated one or more startup parameter values for the media session.

6. The method of claim 5, wherein the one or more attribute values form a network context for the computing device descriptive of the network connection for the computing device,
wherein the model is selected from a plurality of models using the one or more attribute values and the network context, and
wherein the plurality of models includes a first model trained via a machine learning technique using historical data regarding a plurality of previously executed media sessions.

7. The method of claim 1, comprising:
subsequent to initiating the media session on the computing device through the network connection using the initialization values:
receiving data regarding one or more session parameters of the media session while the media session is executing; and
updating execution of the media session using the one or more session parameters.

8. A system for selecting network parameter values for online communication between computing devices, the system comprising:
one or more hardware processors;
one or more memories, storing instructions, which when executed, cause the one or more hardware processors to perform operations comprising:
prior to initiating a media session and prior to receiving feedback data indicative of one or more metrics of a network connection for a computing device for the media session:
receiving one or more attribute values specifying characteristics of the network connection for the computing device for initiating the media session over one or more networks through the network connection;
accessing a plurality of stored media session startup parameter values for initializing a media session, the plurality of stored media session startup parameter values associated with different attribute values;
selecting one or more of the stored media session startup parameter values for the media session using the received one or more attribute values; and
applying the selected one or more startup parameter values as initialization values for the media session; and
initiating the media session on the computing device through the network connection using the initialization values.

9. The system of claim 8, wherein applying the selected one or more startup parameter values as the initialization values for the media session are configured to control one or more functions of a protocol stack to execute the media session.

10. The system of claim 8, wherein selecting one or more of the stored media session startup parameter values for the media session using the received one or more attribute values comprises:
selecting one or more of the stored media session startup parameter values for the media session using a relationship between the stored media session startup parameter values for the media session and the received one or more attribute values,
wherein the one or more startup parameter values comprises one or more of a bandwidth, a network connection type, a timeout setting, or a codec, and
wherein the one or more attribute values comprise one or more of a geographic location, a network provider of the one or more networks, a type of the one or more networks, a type of the computing device, a platform of the computing device, a form factor, a time of day, a day of the week, or a workload of the computing device.

11. The system of claim 10, the operations further comprising:
subsequent to initiating the media session on the computing device through the network connection using the initialization values:
receiving feedback data indicative of one or more metrics of the network connection for the computing device for the media session; and
dynamically updating the relationship between the plurality of stored media session startup parameter values and the received one or more attribute values using the received feedback data.

12. The system of claim 8, wherein selecting one or more of the stored media session startup parameter values for the media session using the received one or more attribute values comprises: accessing a model using the received one or more attribute values; and generating, via the model, the one or more startup parameter values for the media session based on the received one or more attribute values, and wherein applying the selected one or more startup parameter values as initialization values for the media session comprises applying the generated one or more startup parameter values for the media session.

13. The system of claim 12, wherein the one or more attribute values form a network context for the computing device descriptive of the network connection for the computing device,
wherein the model is selected from a plurality of models using the one or more attribute values and the network context, and
wherein the plurality of models includes a first model trained via a machine learning technique using historical data regarding a plurality of previously executed media sessions.

14. The system of claim 8, the operations further comprising:
subsequent to initiating the media session on the computing device through the network connection using the initialization values:
receiving data regarding one or more session parameters of the media session while the media session is executing; and
updating execution of the media session using the one or more session parameters.

15. A system for selecting network parameter values for online communication between computing devices, the system comprising:
means for receiving one or more attribute values specifying characteristics of a network connection for the computing device for initiating the media session over one or more networks through the network connection;
means for accessing a plurality of stored media session startup parameter values for initializing a media session, the plurality of stored media session startup parameter values associated with different attribute values;
means for selecting one or more of the stored media session startup parameter values for the media session using the received one or more attribute values;
means for applying the selected one or more startup parameter values as initialization values for the media session; and
means for initiating the media session on the computing device through the network connection using the initialization values.

16. The system of claim 15, wherein the means for selecting one or more of the stored media session startup parameter values for the media session using the received one or more attribute values comprises:
means for selecting one or more of the stored media session startup parameter values for the media session using a relationship between the stored media session startup parameter values for the media session and the received one or more attribute values,
wherein the one or more startup parameter values comprises one or more of a bandwidth, a network connection type, a timeout setting, or a codec, and
wherein the one or more attribute values comprise one or more of a geographic location, a network provider of the one or more networks, a type of the one or more networks, a type of the computing device, a platform of the computing device, a form factor, a time of day, a day of the week, or a workload of the computing device.

17. The system of claim 16, further comprising:
means for receiving feedback data indicative of one or more metrics of the network connection for the computing device for the media session; and
means for dynamically updating the relationship between the plurality of stored media session startup parameter values and the received one or more attribute values using the received feedback data.

18. The system of claim 15, wherein the means for selecting one or more of the stored media session startup parameter values for the media session using the received one or more attribute values comprises: means for accessing a model using the received one or more attribute values; and means for generating, via the model, the one or more startup parameter values for the media session based on the received one or more attribute values, and wherein the means for applying the selected one or more startup parameter values as initialization values for the media session comprises means for applying the generated one or more startup parameter values for the media session.

19. The system of claim 18, wherein the one or more attribute values form a network context for the computing device descriptive of the network connection for the computing device,
wherein the model is selected from a plurality of models using the one or more attribute values and the network context, and
wherein the plurality of models includes a first model trained via a machine learning technique using historical data regarding a plurality of previously executed media sessions.

20. The system of claim 15, further comprising:
means for receiving data regarding one or more session parameters of the media session while the media session is executing, subsequent to initiating the media session on the computing device through the network connection using the initialization values; and
means for updating execution of the media session using the one or more session parameters.

* * * * *